Nov. 29, 1949  H. L. KOUGH  2,489,902
APPARATUS FOR INSPECTION OF THE EYE
Filed March 3, 1947

INVENTOR.
HERBERT L. KOUGH
BY
Florian L. Miller
Atty.

Patented Nov. 29, 1949

2,489,902

UNITED STATES PATENT OFFICE 2,489,902

APPARATUS FOR INSPECTION OF THE EYE

Herbert L. Kough, Erie, Pa.

Application March 3, 1947, Serial No. 731,965

1 Claim. (Cl. 88—20)

This invention relates generally to instruments for inspecting the pupil of the eye to diagnose body defects and diseases through certain malformations and coloring of the pupil of the eye.

Ophthalmoscopes have heretofore been known for inspecting the interior of the eye by use of mirrors or reflecting surfaces, but these have proved to be of very little use in inspecting the pupil and the outer surface of the eyeball in that the bright reflections of light rays from the mirror cause the pupil to contract, thereby making the diagnosis of very little value. Other instruments have been provided to inspect the surface of the eye wherein bulbs are disposed adjacent the end of a tube, but these have proved unsatisfactory because the direct rays from the incandescent lights causes contraction of the pupil of the eye and also changes in color of the pupil of the eye, thereby making any diagnosis from an inspection thereof of practically little value. Furthermore, in these devices, the rays from the lights are directed into the eye of the person making the inspection, thereby further increasing the possibility of serious error in the diagnosis. Although a number of ophthalmoscopes and other tubular members with different light arrangements therein have been provided, these have proven quite unsatisfactory and are generally not in use in that oculists still utilize a hand mirror and hold a light manually to inspect the pupil of the eye with the result that diagnosis based upon inspection of the pupil of the eye is given very little weight.

It is, accordingly, an object of my invention to overcome the above and other defects in instruments for inspecting the pupil of the eye and it is more particularly an object of my invention to provide an instrument for inspecting the pupil of the eye which is simple in construction, efficient in operation, economical in manufacture, and simple and easy to operate.

Another object of my invention is to provide an instrument for inspecting the pupil of the eye in which no direct rays from a light source reach the eye to be inspected and the eye of the person doing the inspecting.

Another object of my invention is to provide an instrument for inspecting the pupil of the eye which causes no contraction of the pupil nor does it cause any change in color or other optical illusion in the pupil of the eye.

Other objects of my invention will become evident from the following detailed description, taken in conjunction with the accompanying drawings, in which Fig. 1 is a vertical sectional view taken longitudinally through my novel instrument for inspecting the pupil of an eye;

Figure 1:
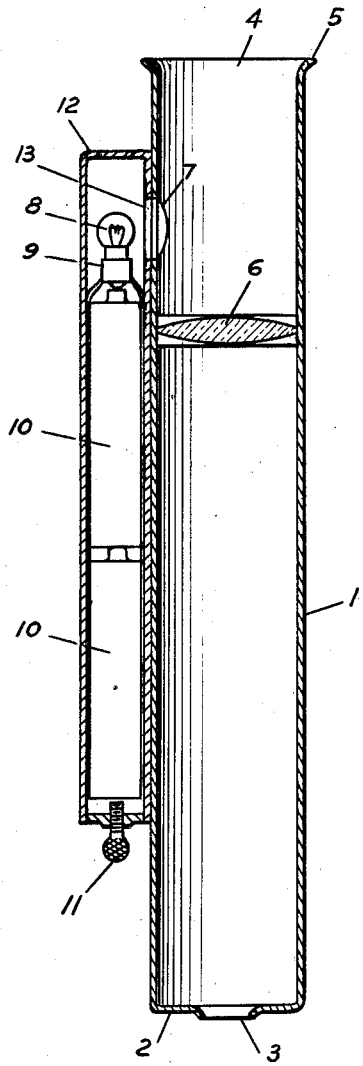

In recent years, study of the pupil of the eye to determine defects in particular organisms of the body and also diseased organisms of the body through variations in the pupil of the eye has greatly increased. The pupil of the eye has a tendency to contract when exposed to the direct rays of a light with the result that the pupil becomes distorted and any study of the eye exposed to direct light is of little value and diagnosis and prognosis based thereon is of little value. I have, therefore, shown as an illustration of an embodiment of my invention in Figs. 1 and 2 a tubular member 1 having a closed end 2 with a sighting aperture 3 and an open end 4 with flared-out marginal portions 5. Intermediate the open end 4 and the closed end 2 of the tubular member 1, I dispose a lens 6 for magnifying purposes. Intermediate the open end 4 of the tubular member 1 and the lens 6, I have provided an aperture 7 in the side of the tubular member 1 adjacent an incandescent light 8 disposed in a socket 9 and energized by batteries 10 and a switch 11. The batteries 10 and incandescent light 8 are disposed in a suitable casing 12 which is preferably attached to the outer side of the tubular member 1, the casing 12 having an aperture 13 which is aligned with the aperture 7 in the tubular member 1.

In operation, the open end 4 of the tubular member 1 is disposed in the eye socket adjacent the upper part of the nose of a patient so that no light comes from an outside source to the pupil or any other surface of the eyeball. The incandescent light 8 is then energized by means of the switch 11 and the eye is inspected through peep hole 3 in the closed end 2 of the tubular member 1. Direct rays from the incandescent light 8 do not reach the lens 6 nor do the direct rays from the light 8 reach the pupil of the eye. The inner surface of the tubular member 1 adjacent the open end 4 thereof is of a dull finish and therefore no sharp reflections reach the eye.

due to reflection of the rays from the inner surface of the tubular member 1. The light source does not cause any contraction of the eye of the person peeking through the sight hole 3 nor do the rays of the light 8 in any way cause contraction or change in color of the pupil of the eye being inspected.

Figure 3:
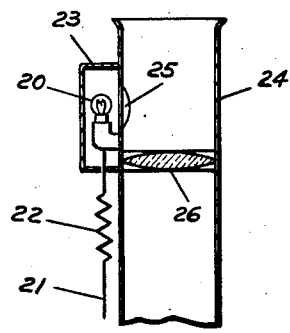
Fig. 3 is a fragmentary longitudinal sectional view of a modified form of instrument for inspecting the pupil of an eye.
Figure 2:
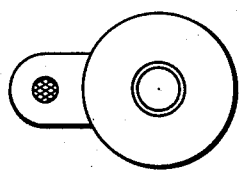
Fig. 2 is an end view of the instrument shown in Fig. 1.

In Fig. 3 I have shown a modified form of my invention which is of the same construction and operation as the instrument shown in Figs. 1 and 2 except that instead of providing batteries as in Figs. 1 and 2 I have provided an incandescent light 20 which is energized directly from a conventional 110 volt line wire in a house. I have shown an electric wire 21 having a resistance 22 therein leading from the incandescent light 20 in order to reduce the voltage in the electric line 21 although it will be evident that a transformer or any other means may be utilized for reducing the voltage to the incandescent light 20. The incandescent light 20 is disposed in a casing 23 adjacent tubular member 24 having an aperture 25 and a lens 26 of the same construction as the tubular member shown in Fig. 1. It will be evident upon observation that the operation of the instruments shown in Figs. 1 and 3 are identical.

Figure 4:
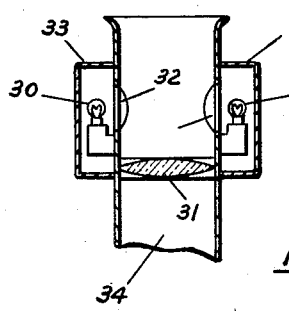
Fig. 4 is a fragmentary longitudinal sectional view of another modified form of my invention.

In Fig. 4 I show another modified form of my invention in which oppositely disposed incandescent lights 30 in casings 36 are disposed adjacent opposite apertures 32 in the side of a tubular member 34 having a lens 31 and being of the same general construction as the tubular members 1 and 24 shown in Figs. 1 and 3. The light rays from the lights 30 are diffused and a very good light is provided to inspect the pupil of an eye without causing contraction thereof and contraction of the eye of the person making the diagnosis.

From the description, it will be observed that I have provided a novel means for inspecting the outer surface of an eyeball and particularly the pupil of an eye without causing contraction of the pupil of the eye or any changes in coloring thereof in order to observe any body organic defect or disease through inspection of the eye.

Various changes may be made in the specific embodiment of my invention without departing from the spirit thereof, or from the scope of the appended claim.

What I claim is:

Apparatus for inspecting the pupil of an eye comprising a tubular member having an open end for disposal in an eye socket and a closed end having a sighting aperture, a comparatively small, laterally extending aperture adjacent the open end of said tubular member, a lens disposed in said tubular member intermediate said laterally extending aperture and the closed end thereof, a lamp disposed adjacent to and spaced from the outer side of said laterally extending aperture in said tubular member, a source of electrical energy for said lamp, and switching means for energizing and de-energizing said lamp, the interior portion of said tubular member between the open end thereof and the lens therein having a comparatively dull finish to minimize the reflection of direct rays through the open end of the tube while providing a diffused illumination to thereby illuminate an eye under inspection positioned adjacent said open end of said tube.

HERBERT L. KOUGH.

REFERENCES CITED

The following references are of record in the file of this patent:

UNITED STATES PATENTS

| Number | Name | Date |
|---|---|---|
| 738,887 | DeZeng | Sept. 15, 1903 |
| 943,728 | Baum | Dec. 21, 1909 |
| 1,548,780 | Herbert | Aug. 4, 1925 |
| 1,631,329 | Patterson | June 7, 1927 |
| 1,814,540 | Bander | July 14, 1931 |
| 1,961,309 | Thorner | June 5, 1934 |
| 2,092,672 | Hyatt | Sept. 7, 1937 |
| 2,110,310 | Shayes et al. | Mar. 8, 1938 |